INVENTOR.
Lewis L. Bognar
BY Burton L. Turner
ATTORNEY

INVENTOR.
Lewis L. Bognar
BY
ATTORNEY

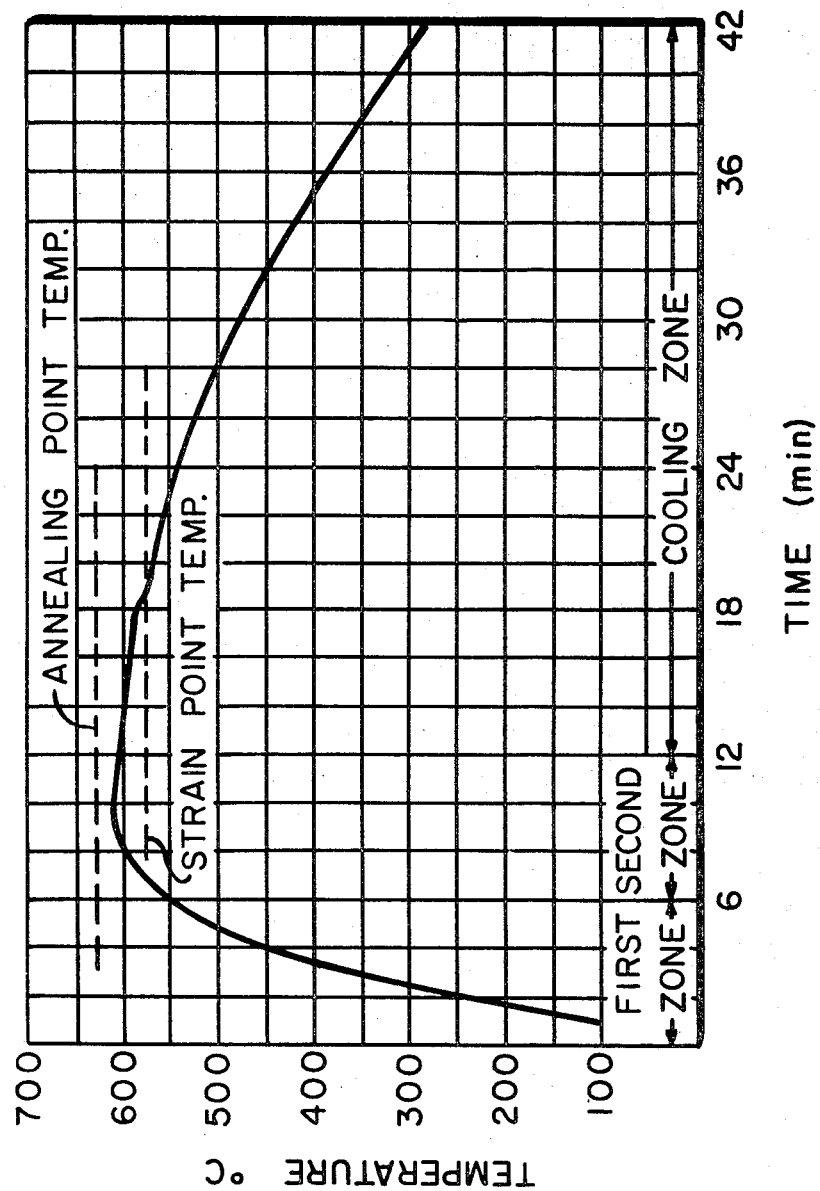

United States Patent Office 3,728,097
Patented Apr. 17, 1973

3,728,097
COMPRESSION SAGGING OF SHEET GLASS
Lewis L. Bognar, Painted Post, N.Y., assignor to Corning Glass Works, Corning, N.Y.
Filed Apr. 9, 1971, Ser. No. 132,757
Int. Cl. C03b 23/02
U.S. Cl. 65—102                4 Claims

ABSTRACT OF THE DISCLOSURE

The surface characteristics of as-drawn glass sheet are provided with improved flatness uniformity by positioning such sheet between a pair of precision ground fused silica slabs and subjecting such assembly to controlled radiant heat energy for a predetermined period so as to compressibly sag the sheet between the fused silica slabs and thereby provide improved surface flatness not heretofore obtainable.

BACKGROUND OF THE INVENTION

In the past it has been customary to manufacture memory discs for computers from aluminum. Such discs range in diameter from about 8" to about 26" and may have a thickness of from about .05" to about .27". It is necessary that such discs be flat, free from surface waviness, scratches, pits, and other surface defects. The use of glass as a substrate for memory discs has not been considered to be practical since the surface quality commercially obtainable does not meet the high standards required for memory discs. That is, a 14" diameter glass memory disc having a thickness of from between .050" and .080" has to be flat in rotation to less than .004" amplitude over both of its major surfaces. In addition, its surface feature acceleration, as determined by the pitch or frequency of waviness, cannot exceed $1500''/sec.^2$, as the disc is rotated at 2400 r.p.m.

Since sheet glass is not manufactured to such quality standards through sustained periods of time by any of the currently known processes, it was necessary to devise a process by which as-drawn sheet glass could be sagged to within the required flatness tolerances. Although sagging processes are well known for generally recontouring the shape of glass sheet, none of the known processes are directed toward providing uniform flatness which would produce the desired end results. That is, the known processes of sagging glass sheets are usually directed to forming contoured surfaces and as such are characteristically slow, since adequate time must be allowed to heat both the sheet to be formed and the forming mold at a uniform rate so as to facilitate the contouring of the sheet while preventing the shocking of the glass and minimizing the differential thermal stresses developed over the major glass surfaces. Also, with these known free sagging processes, it is necessary to heat the glass subtantially above it annealing point temperature, so that it may obtain flatness, however such temperatures generally attribute to detrimental surface damage and require extensive cooling periods.

A further problem that is usually encountered with the known process of sagging sheet glass resides in the fact that wavy glass having a given amplitude or wave height and pitch or wave frequency, will tend to sag into numerous smaller wave patterns of lesser amplitude but of increased pitch. Although the amplitude of the waviness may be decreased by such sagging, the pitch of the thus formed wavy surface is substantially increased thereby producing deleterious results with respect to surface acceleration.

Since both thickness variations and warp must be removed from as-drawn glass sheet in order to meet the proposed tolerance objectives, normal grinding operations are inadequate to produce the desired flattened sheet glass. That is, since glass tends to yield with the grinding pressures applied thereto during normal grinding operations, the ground sheet will merely spring back to near its original bowed configuration as the pressure is removed, thus defeating the purpose of the grinding operation.

The present invention obviates the problems heretofore encountered with known sagging operations and forms sagged glass substrates for memory discs from sheet glass by positioning glass sheet between a pair of fused silica slabs having a finely ground surface, applying radiant energy to rapidly heat the glass and such slabs to a temperature between the strain point temperature and annealing point temperature of the glass, and then controllably cooling the same during a given time interval.

SUMMARY OF THE INVENTION

The precision sagging of glass sheet in accordance with the present invention to provide improved surface flatness characteristics, is obtained through the novel concept of applying static pressure to the sheet by sandwiching the same between a pair of slabs of a near zero expansion material. Glass sheet to be sagged is first score-cut to a desired configuration and one, two or more pieces of such glass are positioned between a pair of slabs forming a sandwich assembly. The slabs must be made of a near zero expansion material which is transparent to radiation, stable at high temperatures, and has a low heat retention, such as fused silica. The assembly is supported upon a rack and placed within a lehr or kiln having controlled temperature zones. Upon entering the lehr, the assembly is subjected to an initial temperature which is set slightly below the maximum desired temperature of the operation. Accordingly, the temperature of both the slabs and the glass rise through a steep exponential curve toward the initial temperature by absorbing radiant energy through their major surfaces. Since the energy is transmitted evenly through both the top and bottom surfaces, the rise in temperature is uniform throughout the glass and accordingly there is no tendency to thermal shock the glass.

The assembly then passes into a second zone having a maximum desired temperature, preferably between the annealing point temperature of the glass and its strain point. The temperature in the second zone, being slightly higher than that in the first zone, causes a plateu in the exponential temperature rise within the glass. The peak temperature reached by the glass sheet in the second zone, although normally below the annealing point temperature of the glass as it is classically defined, is adequately high to relieve stresses in the glass. Accordingly as the glass reaches its peak temperature, the static pressure of the top sagging slab is adequate to force the glass against the bottom slab, thus producing statically energized compressibly sagged glass sheet.

The sheet is then gradually cooled within the lehr to below its strain point temperature at which time it becomes rigid or set, and accordingly may then be more rapidly cooled. Cooling is effected by the assembly radiating heat back to the surroundings in the lehr. The rate of cooling is somewhat lower than that of heating, and resembles a decaying exponential function with a break in the slope at the strain point temperture. Since the sagged glass looses heat through both surfaces at a uniform rate, thermal stresses which might cause distortion or thermal shock are prevented. Also, upon exiting from the lehr, the two slabs which sandwich the glass sheet, balance the thermal losses from the glass and accordingly prevent breakage which might otherwise occur through "down-shock."

An object of the invention has been to provide a novel method and apparatus for sagging glass sheets to produce improved flatness characteristics by means of static compressive sagging coupled with predetermined thermal control.

BRIEF DESCRIPTION OF THE DRAWINGS

FIG. 6 is a graph illustrating a control cycle utilized to provide the desired end results of the present invention.

DESCRIPTION OF THE PREFERRED EMBODIMENTS

Figure 1:
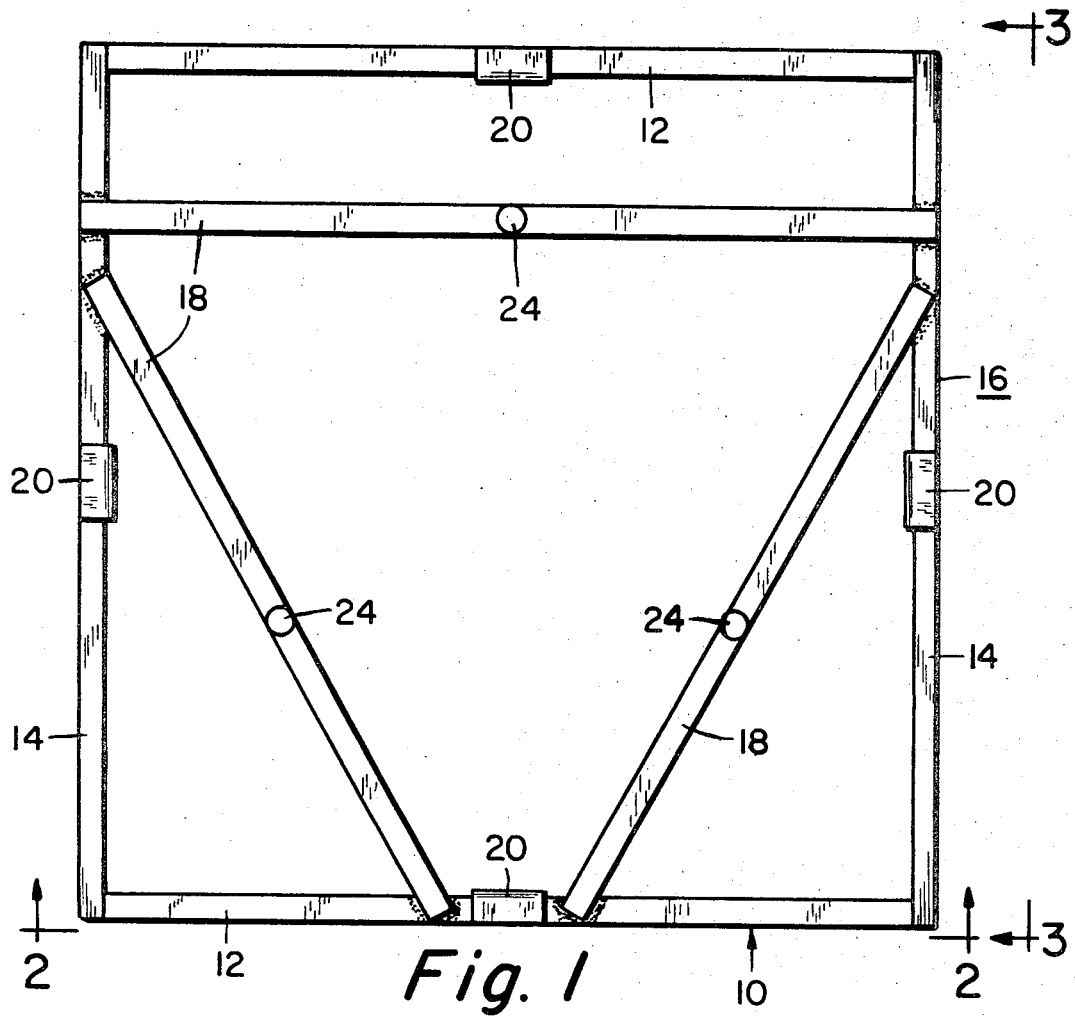
FIG. 1 is a top plan view of a carrying rack for supporting the sandwich assembly of the present invention.
Figure 2:
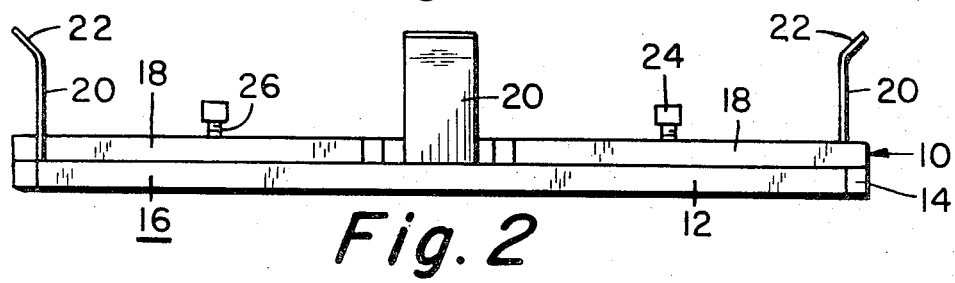
FIG. 2 is a front elevational view of the carrier rack taken along line 2—2 of FIG. 1.
Figure 3:
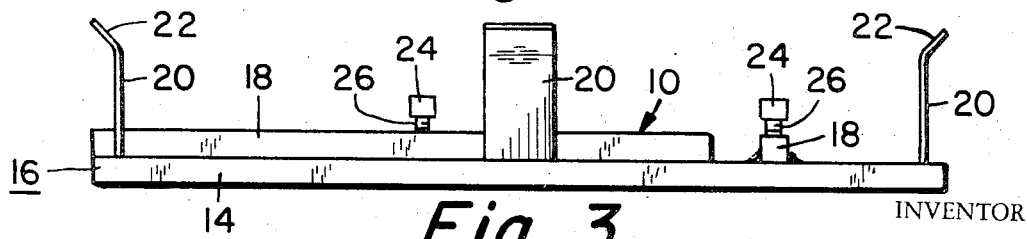
FIG. 3 is a side elevational view of the carrier rack taken along line 3—3 of FIG. 1.

Referring now to the drawings, and particularly FIGS. 1, 2 and 3, a carrying rack 10 is shown comprising front and rear bars 12 and side bars 14, forming a frame member 16 having support bars 18. Opposing pairs of guide members 20, having sloped upper portions 22, are secured to frame 16. The various bars and guide members making up the carrying rack 10 are preferably welded together as a unitary structure.

Each of the support bars 18 has a support pin 24 positioned substantially equally distant from the intersection of the diagonal axes of the frame, and angularly spaced apart approximately 120° about such intersection. Each support pin 24 has a threaded lower portion 26 which threadably engages an opening in each support bar 18 so as to adjustably position the elevation of the upper support head of such pin.

Figure 4:
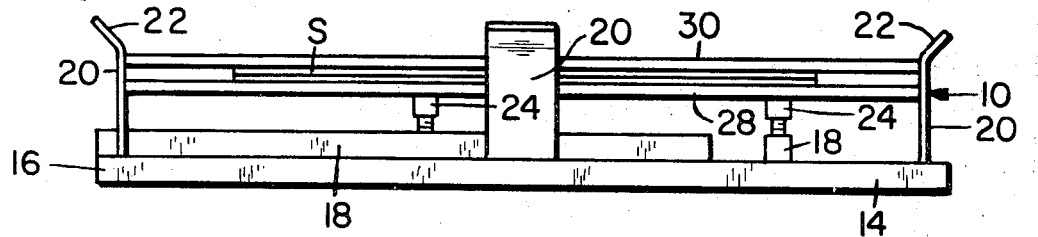
FIG. 4 is a side elevational view similar to FIG. 3, but showing the positionment of the sandwich assembly as carried by the rack.

As shown in FIG. 4, the support pins 24 support a lower slab member 28 at a predetermined distance above the frame 16. A plurality of glass sheets S, to be sagged, is shown positioned upon lower slab member 28 and sandwiched between such lower slab member and an upper slab member 30, which overlies such sheets S. The guide members 20 maintain the slab members 28 and 30 in position upon the carrying rack 10, with the upper sloped portions 22 facilitating the positionment of the slab members in the rack assembly.

Figure 5:
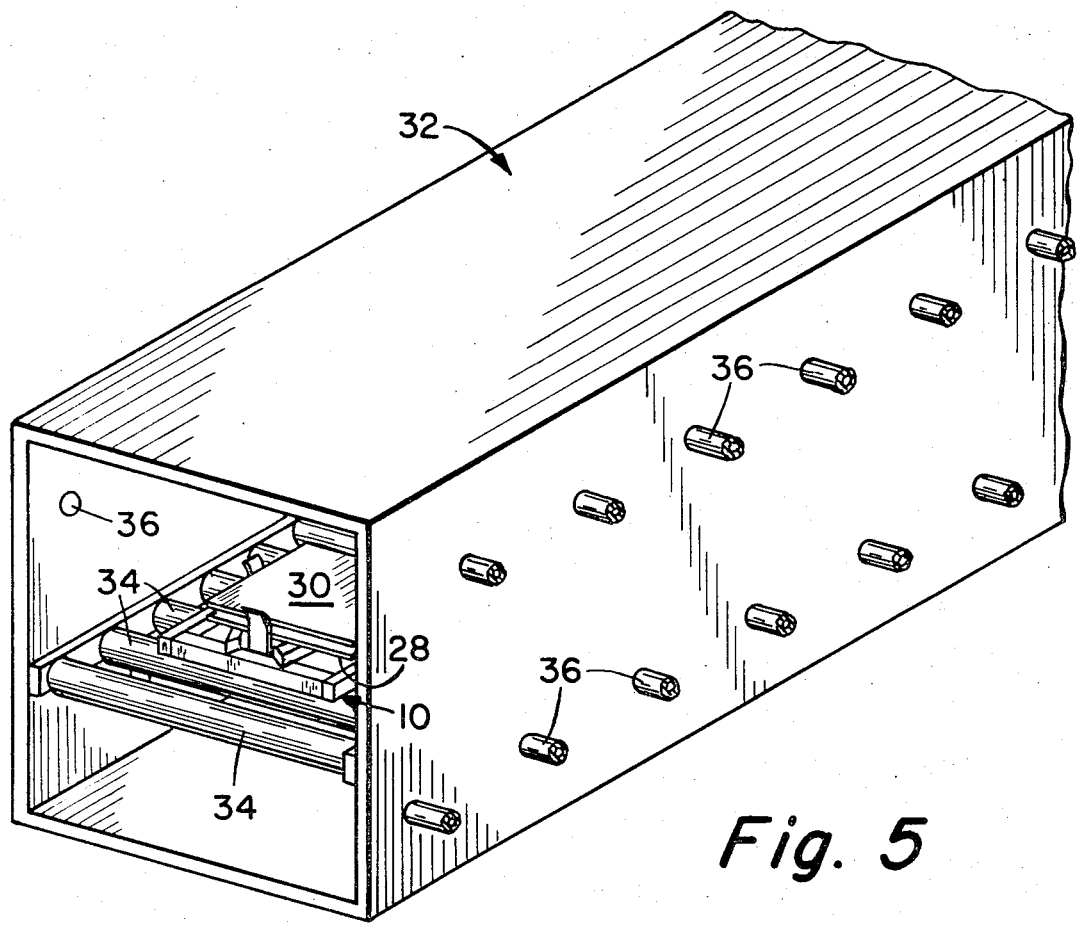
FIG. 5 is a somewhat schematic perspective view of a portion of a roller lehr utilized to implement the thermal control of the present invention.

Referring now to FIG. 5, a fragmental portion of a roller lehr 32 of known construction is shown having a plurality of simultaneously driven rollers 34 and a plurality of burner inlets or ports 36 positioned in staggered relationship above and below the rollers 34 for supplying radiant heat energy to the lehr. A carrying rack 10 having a sandwich assembly 28, 30 is shown positioned upon the rollers 34 for travel through the lehr 32 in accordance with the present invention.

The slab members 28 and 30, are preferably finely ground so as to not only provide a smooth flat reference surface for sagging the sheets S, but also to minimize the adhesion probability of the glass to the slabs. Further, the fine grinding of the slabs results in the formation of an air cushion between the sheets and the slabs which reduces undesirable conductive heat-transfer therebetween. Slab thickness is minimized so as to provide for rapid heat cycling without incurring deformation during heat-up. I have found, that when utilizing fused silica slabs, a thickness of about .35" provides sufficient rigidity while not detracting from efficient heat cycling.

The slab members may be formed from any material having a near zero coefficient of expansion preferably below $10 \times 10^{-7}$ in./in./°C., in order to avoid the inducement of any warpage or deformation in the forming surfaces during cycling. There are of course some thermal gradients between the two surfaces of both slabs during the entire sagging operation, and accordingly if a high thermal expansion material were used, it would warp during sagging and accordingly impart that warp to the sagged glass. In addition, the slab material must be transparent to heat radiation in order to minimize heat gradients and efficiently obtain the sagging process in a relative short period of time. Of course, the material must be stable at high temperatures so as not to deform, and in order to rapidly cool the sagged glass after having reached its peak temperature, such slab material should have low heat retention. Although virtually any material having these properties may be utilized, I have found that a pair of finely ground fused silica slabs of substantially the same thickness, which have an expansion coefficient of about $5.5 \times 10^{-7}$ in./in./°C., provide excellent results in sagging glass sheets to produce improved surface flatness characteristics.

The support pins 24 are located so as to minimize mechanical bending of the assembly. In addition the upper support portions of the pins 24 are positioned at a distance above the frame structure 16 so as to permit the application of radiant energy to the entire surface of the lower slab without incurring a shielding effect from the frame. Accordingly, uniform temperature distribution is obtained upwardly through the lower slab member as well as downwardly through the upper slab member to thereby provide the sheets to be sagged with uniform heat rise.

From the foregoing description it will be apparent to those skilled in the art that the present invention is applicable to virtually any glass composition, and that the specific times and temperatures of the heat cycle will vary with composition. Further, the particular degree of flatness desired will influence the specific temperature utilized within the operable range. That is, for a glass having waviness with a given amplitude and pitch, utilizing a higher temperature during sagging will more effectively reduce the amplitude of the waviness than would a lower temperature; however, the use of the higher temperature may induce secondary waviness, thus increasing the frequency or pitch of the waves in the surface structure, which would not be occasioned with a lower temperature.

Although not intended to be limiting in nature, the following specific example is illustrative of the present invention. A .080" thick sheet of alkali aluminosilicate glass, such as disclosed in British Patent No. 966,733, was cut into 15" diameter sections. After washing the glass, it was inserted in pairs between two finely ground silica slabs, each having a thickness of about .35", to form a sandwich assembly. The slabs were approximately 16½" square, and the lower one was supported on three adjustable support pins forming a part of stainless steel rack. The support pins were equally spaced on a radius of about 5½" about the intersection of the diagonals of a support rack, and were positioned approximately 120° apart about such intersection. The stainless steel carrying rack, having the sandwich assembly thereon, was positioned in a roller hearth lehr having a travel speed of about 6" per minute.

In a first zone the assembly was subjected to a set-point temperature of about 575° C. for a period of 10 minutes, and then traveled into a second zone having a maximum temperature setpoint of about 595° C., which was above the strain point temperature but below the annealing point temperature of the glass being sagged. While in the second zone, the glass reached its peak temperature, and the static pressure of the fused silica slabs acted to compressibly sag the glass sheets therebetween to form smooth glass sheet. After 10 minutes of travel through the second zone, the assembly traveled through a cooling zone for approximately 55 minutes and was discharged from the lehr at a temperature of approximately 300° C. After the assembly left the lehr it was allowed to cool in air for an additional 60 minutes, during which time the upper and lower slabs tended to provide uniform cooling for the glass without permitting thermal shock. The sandwich assembly was then opened and the two sheets of flatly sagged glass were removed therefrom.

FIG. 6 illustrates the temperature cycle of a further embodiment, wherein similar glass sheets of the same composition and thickness of the foregoing illustration were sagged at a higher temperature, utilizing finely ground fused silica slabs having a thickness of about .35″. Initially the assembly was subjected to a setpoint temperature of 575° C. for six minutes, and the temperature of the glass to be sagged rose exponentially. Then, the glass entered the second zone having a setpoint temperature of 620° C., which was just below a 627° C. annealing point temperature of the glass but substantially above its 574° C. strain point temperature. After passing through the second zone the sagged glass began a gradual cooling until it reached its strain point temperature wherein it was then cooled much more rapidly.

Although, as previously pointed out, some latitude may be exercised in setting the peak temperature to which the glass is heated, in order to obtain optimum results it is necessary that the peak temperature obtained by the glass sheet be between its annealing point temperature and its strain point temperature. If the glass to be sagged is heated substantially above the annealing point temperature, surface imperfections may be produced, the glass sheets may have a tendency to adhere to one another, and secondary sagging resulting in increased pitch frequency may be occasioned. If the glass is not heated to the strain point temperature, however, the glass remains sufficiently rigid and internal stresses are not relieved and no permanent flattening is achieved.

Although I have described the now preferred embodiments of my invention it will be apparent to those skilled in the art that various changes and modifications may be made thereto without departing from the spirit and scope thereof as defined in the appended claims.

I claim:

1. Apparatus for sagging glass sheet to provide improved surface flatness characteristics which comprises, a pair of rigid substantially uniform thin slabs, rack means for supporting one of said slabs, said rack means including pin means projecting from a body portion thereof for supporting said one slab with spaced-apart point contact, the other of said slabs being of comparable size and shape positionable over said one slab, said slabs being formed of a silica material having near zero thermal expansion and high transparency to heat radiation, burner means mounted in position to directly apply radiant heat above and below said upper and lower slabs respectively so as to uniformly heat said slabs and a glass sheet to be sagged positioned therebetween to a predetermined temperature wherein the static pressure of said slabs will compressibly sag said sheet to desired flatness, said pin means positioning said one slab in spaced relation relative to the body portion of said rack means to facilitate the direct application of heat to said slabs, and each said slab having a finely ground surface which forms an air cushion between such slab and the glass sheet to be sagged.

2. A method of flattening glass sheets which comprises, positioning at least one glass sheet to be flattened between a pair of thin slabs having opposed faces of desired surface contour and having near zero thermal expansion and high transparency to heat radiation to form a sandwich assembly, directly applying heat above and below said pair of slabs to heat the glass sheet within said assembly to a maximum temperature between the annealing point temperature and strain point temperature of the glass to be flattened, maintaining said sheet between said annealing point and strain point temperatures until said sheet is conformed to the surface contour of the opposed faces of said slabs in response to the static pressure of said slabs, and cooling the thus conformed glass sheet.

3. A method of flattening glass sheet as defined in claim 2 including the step of rapidly heating the sandwich assembly to said maximum temperature between said annealing point temperature and said strain point temperature of the glass being conformed, then cooling such glass slowly until it reaches its strain point temperature, and finally cooling the glass at a more rapid rate after passing through its strain point temperature.

4. A method of flattening glass sheet as defined in claim 2 wherein the sandwich assembly is initially subjected to a temperature slightly below the maximum temperature to raise the temperature of the glass through a steep exponential curve, and then subjecting the assembly to the maximum temperature of the system.

References Cited

UNITED STATES PATENTS

| | | | |
|---|---|---|---|
| 2,901,811 | 9/1959 | Hall | 65—102 X |
| 3,208,839 | 9/1965 | Nordberg | 65—106 X |
| 2,395,727 | 2/1946 | Devol | 65—273 X |

ARTHUR D. KELLOGG, Primary Examiner

U.S. Cl. X.R.

65—107, 273, 275